(12) United States Patent
Mora Ordóñez

(10) Patent No.: US 9,284,038 B2
(45) Date of Patent: Mar. 15, 2016

(54) AIRCRAFT VENTRAL FAIRING WITH AN IMPROVED STORAGE CAPACITY

(71) Applicant: AIRBUS OPERATIONS SL, Getafe (ES)

(72) Inventor: Coral Aida Mora Ordóñez, Getafe (Madrid) (ES)

(73) Assignee: AIRBUS OPERATIONS S.L., Madrid (ES)

( * ) Notice: Subject to any disclaimer, the term of this patent is extended or adjusted under 35 U.S.C. 154(b) by 124 days.

(21) Appl. No.: 14/140,665

(22) Filed: Dec. 26, 2013

(65) Prior Publication Data

US 2014/0183301 A1 Jul. 3, 2014

(30) Foreign Application Priority Data

Dec. 27, 2012 (EP) .................................. 12382540

(51) Int. Cl.
*B64C 1/26* (2006.01)
*B64C 7/00* (2006.01)

(52) U.S. Cl.
CPC .... *B64C 7/00* (2013.01); *B64C 1/26* (2013.01)

(58) Field of Classification Search
CPC ............ B64C 1/26; B64C 7/00; B64D 29/06; B64D 29/04
See application file for complete search history.

(56) References Cited

U.S. PATENT DOCUMENTS

| 2,927,749 | A | * | 3/1960 | Brownell ..................... 244/45 R |
| 5,542,626 | A | * | 8/1996 | Beuck et al. .................. 244/107 |
| 6,581,877 | B2 | * | 6/2003 | Pauly ............................. 244/131 |
| 7,407,135 | B2 | * | 8/2008 | Rouyre ......................... 244/119 |
| 8,066,221 | B2 | * | 11/2011 | Rouyre ......................... 244/119 |
| 8,336,811 | B2 | | 12/2012 | Cazals et al. |
| 2006/0065784 | A1 | | 3/2006 | Rouyre |
| 2008/0099610 | A1 | * | 5/2008 | Jimenez Del Lago et al. ............................. 244/119 |
| 2009/0078830 | A1 | | 3/2009 | Fol et al. |
| 2010/0170987 | A1 | | 7/2010 | Meyer |
| 2010/0282907 | A1 | * | 11/2010 | Martin Hernandez ........ 244/130 |
| 2011/0121133 | A1 | | 5/2011 | Mueller et al. |

FOREIGN PATENT DOCUMENTS

| EP | 1 918 194 | 5/2008 |
| FR | 2 942 772 | 9/2010 |

OTHER PUBLICATIONS

European Search Report for EP 12382540.8, dated May 31, 2013.

* cited by examiner

*Primary Examiner* — Tien Dinh
*Assistant Examiner* — Richard R Green
(74) *Attorney, Agent, or Firm* — Nixon & Vanderhye P.C.

(57) ABSTRACT

The invention provides an aircraft with a ventral fairing able to store equipment and systems in lateral zones. The ventral fairing (20) comprises a first zone of length L1 along the X-axis, where the area of the cross-section perpendicular to the X-axis increases in the direction of the air flow and a second zone of length L2, where the area of the cross-section perpendicular to the X-axis decreases in the direction of the air flow, being L1>L2 and being placed the rear end of said first zone behind the intersection of the trailing edge of the wing (15) with the fuselage (13).

6 Claims, 4 Drawing Sheets

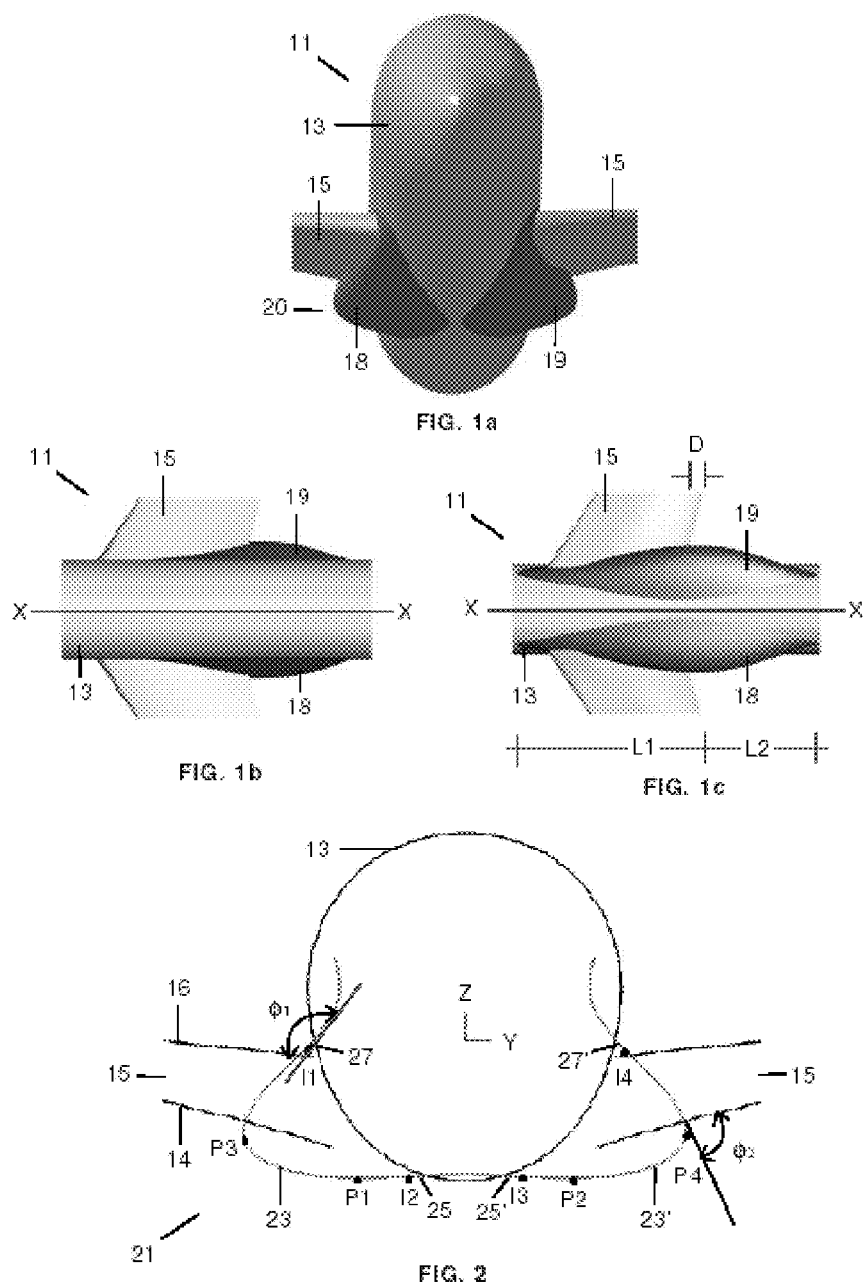

AIRCRAFT VENTRAL FAIRING WITH AN IMPROVED STORAGE CAPACITY

This application claims priority to EP Application No. 12382540.8, filed 27 Dec. 2012, the entire contents of each of which are hereby incorporated by reference.

FIELD OF THE INVENTION

This invention relates to the ventral fairing of an aircraft (also called belly fairing) and, more in particular, to a ventral fairing having enough storage capacity for equipment and systems located between the wing and the fuselage.

BACKGROUND OF THE INVENTION

The aircraft ventral fairing shall store equipment and systems located between the wing and the fuselage such as air conditioning equipment, fuel systems and the landing gear. The size and location of the landing gear bay is the main constraint for the ventral fairing design.

The ventral fairing aerodynamic effect can be significant at high subsonic speeds (close to the transonic regime) and at low speeds (close to the incompressible regime). High subsonic speeds can be defined as speeds at which the Mach number (Mn) is between 0.7 and 0.95 so that the flow regime compressibility effects cannot be neglected. The compressibility effects in this flow regime are a function of the thickness ratio for lifting surfaces as wings and of the cross sectional area distribution of the ventral fairing. In conclusion, to reduce the drag impact in this speed region (around transonic flow regime) the concept of area ruling plays an important role.

The main objective of the ventral fairing aerodynamic design is to minimize the negative interferences between the wing, the fuselage and the ventral fairing, in order to achieve the least aerodynamic drag penalty and lift loss possible and to improve the airflow adherence conditions around the wing surface.

Two basic ventral fairing designs are known in the prior art.

The first case is a substantially convex ventral fairing projecting below the contour of the fuselage, whose interference with the aerodynamics of the wing is limited to viscous effects, fundamentally on the upper outer surface of the wing via the upper central zone of the fairing commonly known as the "fillet", while the rest (front, lower central and rear zone) of the fairing generally possesses a gentle curvature in the direction of the air flow with the aim of minimizing the growth of the boundary layer of the actual fairing, but without strongly interacting with the airflow around the wing. An example of this approach is the ventral fairing of the AIRBUS A330.

The second case is a more complex ventral fairing projecting minimally below the contour of the fuselage, with a greater degree of favorable aerodynamic interaction with the wing, due primarily to the fact that the evolution in the direction of the longitudinal axis of the fuselage (X-axis) of the cross-sectional area enclosed by the fairing is highly integrated in the law of global areas of the aircraft (Richard T. Whitcomb, 1952), the penalization in the aerodynamic drag of the aircraft at high subsonic speeds being reduced in comparison with the above-mentioned design. An example of this approach is the ventral fairing of the AIRBUS A380. Another example is the ventral fairing disclosed in EP 1 918 984.

The equipment and systems that shall be stored in the ventral fairing are becoming increasingly complex due to technological improvements and involve very specific requirements for their storage which are not met by the known ventral fairings.

SUMMARY OF THE INVENTION

It is an object of the present invention to provide an aircraft with a ventral fairing able to improve its lateral storage capacity minimizing its negative interferences with the wing and the fuselage.

This and other objects are met by a ventral fairing configured by a symmetrical streamlined surface with respect to the aircraft symmetry plane enclosing together with the fuselage and the wing an inner space comprising a first zone of length L1 along the X-axis, where the area of the cross-section perpendicular to the X-axis of said inner space increases in the direction of the air flow, and a second zone of length L2 along the X-axis, where the area of the cross-section perpendicular to the X-axis of said inner space decreases in the direction of the air flow. The length of the first zone L1 is greater than the length of the second zone L2 and the rear end of the first zone is placed behind the intersection of the trailing edge of the wing with the fuselage.

The volume increase in the first zone and the volume decrease in the second zone may be implemented by increasing and decreasing particularly the lateral capacity of the ventral fairing.

In one embodiment, the contour of the cross-sections of the ventral fairing along the X-axis is configured by symmetrical curves with respect to the aircraft symmetry plane having a variable curvature and comprising at each side of the symmetry plane, in at least some of said cross-sections, at least a convex part and two concave parts. The lower points and the most lateral points of the contour are located in the convex part. On the other hand, the contour of the longitudinal sections of the ventral fairing, in at least some of said longitudinal sections, is configured by curves having a variable curvature and comprising at least a central convex part and two concave parts ending in their intersections with the fuselage or the lower surfaces of the wing. This configuration allows the above-mentioned volume distribution of the ventral fairing.

Other desirable features and advantages of this invention will become apparent from the subsequent detailed description of the invention and the appended claims, in relation with the enclosed drawings.

BRIEF DESCRIPTION OF THE DRAWINGS

FIGS. 1a, 1b, 1c are, respectively, a perspective view, a top plan view and a bottom plan view of an aircraft with a ventral fairing according to this invention.

FIG. 2 is a cross section of an aircraft with a ventral fairing according to this invention illustrating its main geometric features.

DETAILED DESCRIPTION OF THE INVENTION

Figure 3:
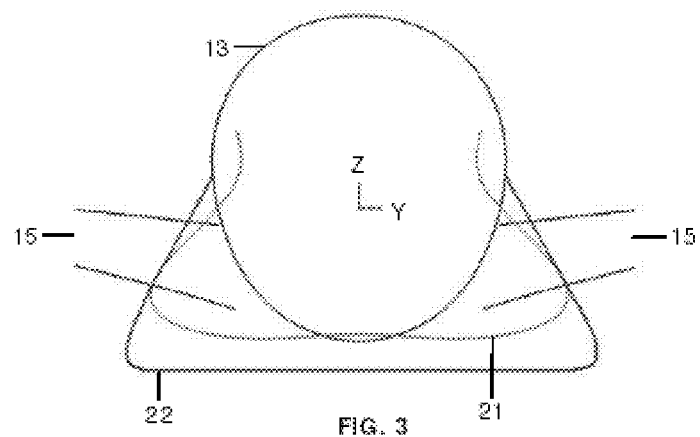
FIG. 3 adds to FIG. 2 a known ventral fairing sharing the intersection point with the lower surface of the wing.

As shown in FIGS. 1a, 1b and 1c, the ventral fairing 20 of the aircraft 11 according to an embodiment of this invention encloses together with the fuselage 13 and the wing 15 an inner space comprising two separated compartments 18, 19 having more volume at their lateral areas than at their central areas and more volume at their rear areas than at their forward areas.

Along the X-axis the volume enclosed by the ventral fairing 20 increases in a first zone of length L1 ending behind the intersection of the trailing edge of the wing with the fuselage and decreases in a second zone of length L2, being L2<L1 (see FIG. 1c). Preferably the ratio L2/L1 is comprised between 0.50-0.85.

In other words, the storage capacity of the ventral fairing 20 is not distributed uniformly along the X-axis and along the Y-axis.

Figure 6:
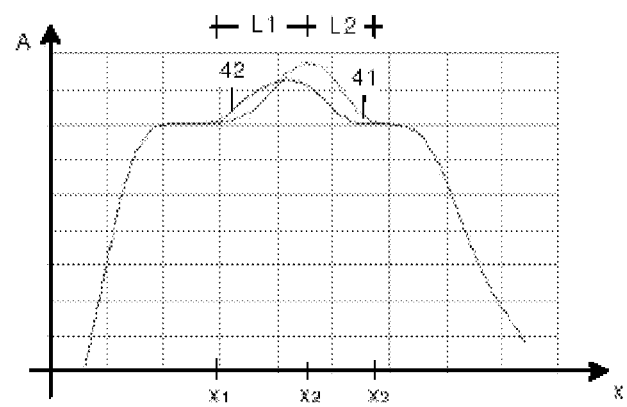
FIG. 6 is a fuselage area ruling distribution of an aircraft having a ventral fairing according to this invention and of an aircraft having a known ventral fairing.

It is therefore a ventral fairing quite different to known ventral fairings which is configured to obtain a better area ruling integration (shown in FIG. 6).

The contour of the cross sections of the ventral fairing 20 perpendiculars the X-axis has the shape shown in FIG. 2 which is a symmetric curve 21 with respect to the plane of the symmetry of the aircraft having the following features:

- Each side of the curve 21 may comprise a central convex part 23, 23' between the points of inflection I1, I2; I3, I4 and two concave parts 25, 25'; 27, 27' between, respectively, the points of inflection I1, I4; I2, I3 and the intersection points with the wing 15 and the fuselage 13 as seen from the inside of the curve 21, as shown in FIG. 2, or only a convex part depending on the position of the intersection points with the wing 15 and the fuselage 13. Although in FIG. 2, the lower part of each side of the curve 21 intersect the fuselage, in other embodiments it may be placed below the fuselage so that the ventral fairing 20 will be configured as a single compartment.
- The central convex parts 23, 23' comprise the lower points P1, P2 and the extreme points of the lateral borders P3, P4 of the curve 21.
- The angle $\phi_1$ between the line 16 of the upper surface of the wing 15 and tangent lines to the each side of the curve 21 in their intersection points is comprised between 90°-120° in all the cross-sections of the ventral fairing 20.
- The angle $\phi_2$ between the line 14 of the lower surface of the wing 15 and tangent lines to each side of the curve 21 in their intersection points is comprised between 70°-90° in all the cross-sections of the ventral fairing 20.

As said before, one of the relevant features of the ventral fairing 20 according to this invention is having more volume in its lateral zones than in its central zones. In this respect, FIG. 3 shows both the curve 21 of a typical cross section of the ventral fairing 20 according to this invention and the curve 22 of a known fairing if the latter would have to reach the same intersection points with the lower surface of the wing 15. The known fairing would therefore have an exaggerated volume to attend storage needs in lateral zones.

Figures 4A, 4B:
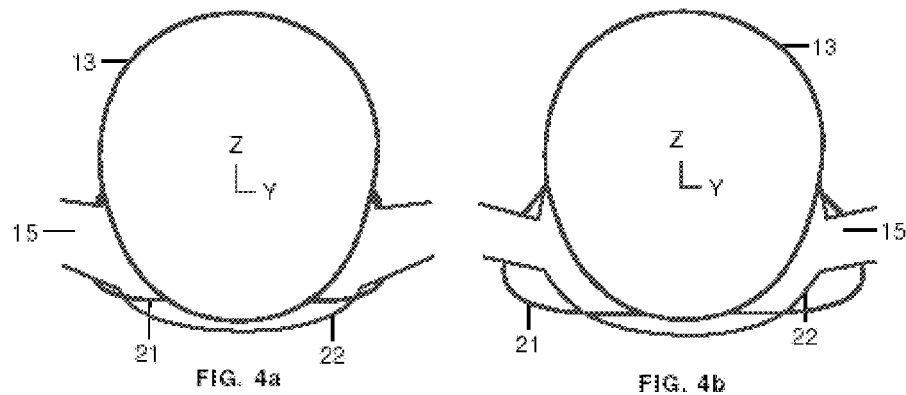
FIGS. 4a, 4b and 4c are three cross section views of an aircraft with a ventral fairing according to this invention superimposed to a known ventral fairing at different positions along the X-axis.
Figure 4C:
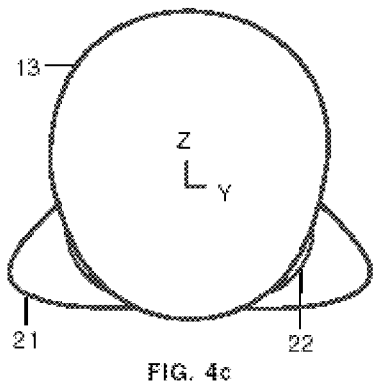

FIGS. 4a, 4b and 4c show the curve 21 in cross-sections placed respectively, in a forward, in a middle and in a rear section (behind the wing) of the ventral fairing 20 and also a curve 22 of a known fairing in the same sections for a better illustration of their differences.

Figure 5:
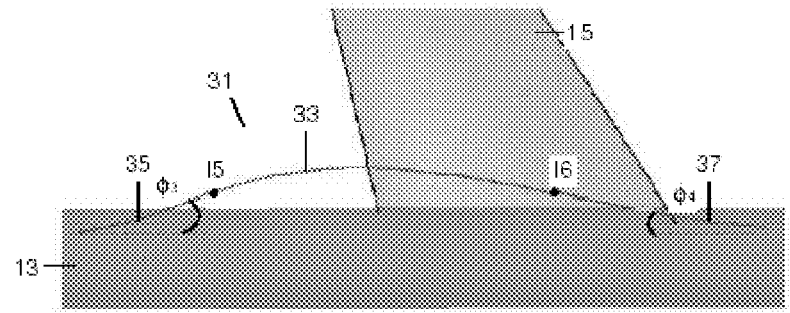
FIG. 5 is a longitudinal section of an aircraft with a ventral fairing according to this invention illustrating its main geometric features.

The contour of longitudinal sections of the ventral fairing 20 (perpendicular sections to the Y-axis) has the shape shown in FIG. 5, which is a curve 31 having the following features:

- The curve 31 may comprise a central convex part 33 between the points of inflection I5, I6 and two concave parts 35, 37 between, respectively, the points of inflection I5, I6 and the intersection points with the fuselage 13 and/or the wing 15 as seen from the inside of the curve as shown in FIG. 5, or only a convex part depending on the position of the intersection points with the fuselage 13 and/or the wing 15.
- The angle $\phi_3$ between tangent lines to the curve 31 of a longitudinal section of the ventral fairing 20 and to the curve of the fuselage 13 in said longitudinal section in its rear intersection point depends on structural and sealing constraints and shall be less than 15°.
- The angle $\phi_4$ between tangent lines to the curve 31 of a longitudinal section of the ventral fairing 20 and to the curve of the fuselage 13 in said longitudinal section in its forward intersection point depends on structural and sealing constraints and shall be less than 6°.

FIG. 6 shows, respectively, curves 41, 42 representing, respectively, the distribution of the area A of the cross sections of a fuselage having a ventral fairing 20 according to this invention and a known ventral fairing along the X-axis.

The ventral fairing 20 according to this invention comprises a first zone of length L1 between the coordinates x1 and x2, where the area of the cross-section of the inner space enclosed by the ventral fairing, the fuselage and the wing increases along its length (in the air flow direction), and a second zone between the coordinates x2 and x3 of a length L2, where the area of the cross-section of the inner space enclosed by the ventral fairing, the fuselage and the wing decreases along its length (in the air flow direction), being L1>L2.

As said before, the coordinate x2 is placed behind the intersection of the trailing edge of the wing with the fuselage.

While in the known ventral fairing the volume is evenly distributed in the X-axis, in the ventral fairing 20 according to this invention the volume at the beginning is almost negligible and then increases progressively both in the X-axis and in the Y-axis up to the end of the first zone. In the second zone the volume decreases progressively up to the rear end. On the other hand, in both zones there is a small volume (or no volume at all) at the bottom of the fuselage at both sides of the plane of symmetry of the aircraft thus improving the performance of the air flow through the bottom of the aircraft.

This innovative volume distribution allows hosting equipment and systems that require higher lateral volume providing to the aircraft a higher storage capacity (30-40% higher than known ventral fairings) without suffering aerodynamic penalties.

From a purely aerodynamic point of view, a ventral fairing 20 according to this invention has the following advantages with respect to a known ventral fairing.

Figure 7:
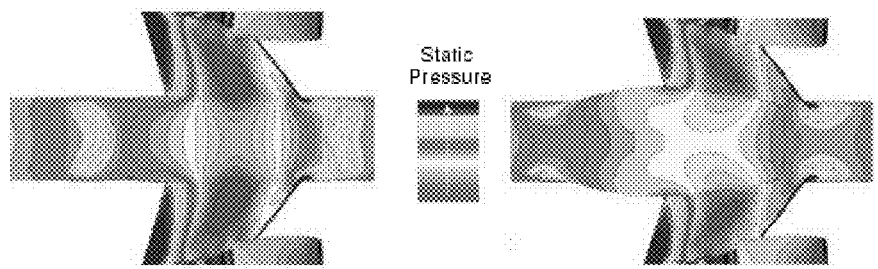
FIG. 7 is a map of the static pressure on the lower surface of an aircraft with a known ventral fairing (left) and on the lower surface of an aircraft with a ventral fairing according to the invention (right).

In the first place, the aerodynamic performance of the lower surface of the aircraft is improved. As shown in FIG. 7 the air flow on the lower ventral fairing has been modified obtaining a homogeneous air flow on that region. Thus a reduction of the adverse pressure gradient on the lower surface of the inner wing is achieved as shown in FIG. 7.

Figure 8:
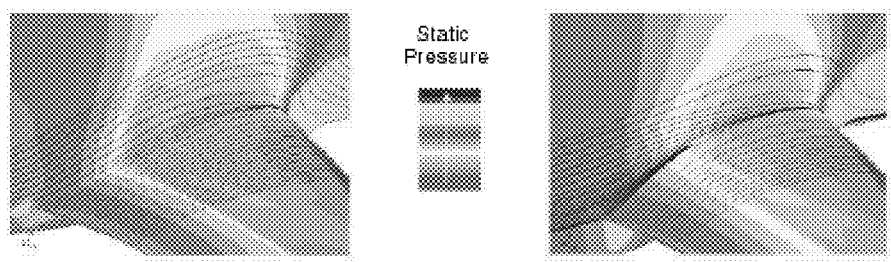
FIG. 8 is a map of static pressure on the upper surface of the wing of an aircraft with a known ventral fairing (left) and on the upper surface of the wing of an aircraft with a ventral fairing according to the invention (right).

In the second place, the aerodynamic performance of the upper wing surface is improved as well. As shown in FIG. 8 there is no air flow separation at the upper wing trailing edge-fuselage intersection improving the aerodynamic performance in that region. In that case, the aircraft will not need any Hackett fairing or special sealing to attach the air flow in that area. In summary, a weight reduction and a better aerodynamic behavior are achieved.

Figure 9:
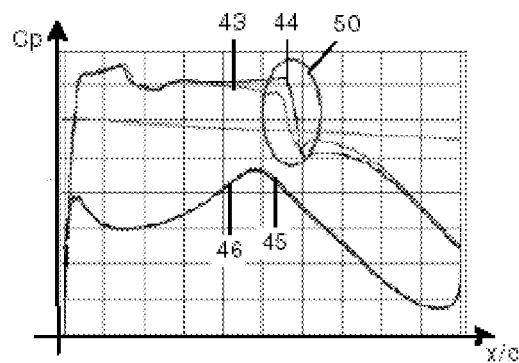
FIG. 9 is a diagram of the distribution of static pressure along a profile of the wing in an aircraft with a known ventral fairing and in an aircraft with a ventral fairing according to the invention.

In the third place, the aerodynamic performance of the wing is improved as illustrated in FIG. 9 by the distributions 44, 43; 46, 45 of the pressure coefficient Cp on its upper and lower surfaces along the chord of an inner wing profile of an aircraft with a known ventral fairing and of an aircraft with a ventral fairing 20 according to the invention. In particular, the inner upper wing surface shock is reduced (marked with the circle 50).

Figure 10:
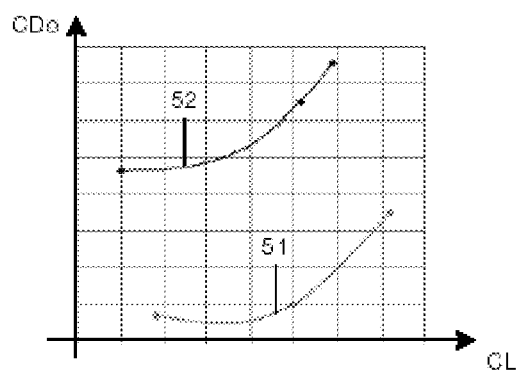
FIG. 10 shows CL vs. $CD_O$ curves in an aircraft with a known ventral fairing and in an aircraft with a ventral fairing according to the invention.

On the fourth place, a global aerodynamic improvement is achieved as illustrated in FIG. 10 showing the Coefficient of Lift (CL) vs. Coefficient of Drag ($CD_O$) curves 52, 51 of an aircraft with a known ventral fairing and of an aircraft with a ventral fairing 20 according to the invention.

Summing up said advantages:

The incident air on the ventral fairing is modified in a more homogeneous manner (near the plane of symmetry) giving a more uniform air flow around the aerodynamic surface involving both a reduction in the adverse pressure gradient on the ventral fairing and a decrease of the negative effects of the compressibility of air at high Mach numbers.

At the same CL, the $CD_O$ of an aircraft with a ventral fairing according to the invention is improved in a magnitude of around 1.5% with respect to an aircraft with a known ventral fairing.

Therefore the ventral fairing 20 according to this invention provides a more useful volume in its rear part (behind the wing trailing edge) with fewer penalties in drag than known ventral fairings meeting the requirements of those aircraft that need a large volume for the storage of equipment and systems.

Although the present invention has been described in connection with various embodiments, it will be appreciated from the specification that various combinations of elements, variations or improvements therein may be made, and are within the scope of the invention.

The invention claimed is:

1. An aircraft comprising:
a fuselage having a longitudinal or X-axis,
a wing, and
a ventral fairing,
the ventral fairing being configured by a symmetrical streamlined surface with respect to the aircraft symmetry plane enclosing together with the fuselage and the wing an inner space,
the ventral fairing comprising
a first zone of a length L1 along the X-axis, where the area of the cross-section perpendicular to the X-axis of the inner space increases in the direction of air flow, and
a second zone of a length L2 along the X-axis, where the area of the cross-section perpendicular to the X-axis of the inner space decreases in the direction of air flow, being L1>L2 and being the second zone is placed at the rear end of said first zone behind the intersection of the trailing edge of the wing with the fuselage,
the contour of the cross-sections perpendicular to the X-axis of the ventral fairing being configured by symmetrical curves with respect to the aircraft symmetry plane having a variable curvature and comprising at each side of the symmetry plane in at least some of them at least a convex part, where the lower points (P1, P2) and the most lateral points (P3, P4) of the contour are located, and two concave parts,
the contour of the longitudinal sections of the ventral fairing being configured by curves having a variable curvature and comprising, in at least some of them, at least a central convex part and two concave parts ending in their intersections with the fuselage or with the surfaces of the wing.

2. The aircraft according to claim 1, wherein the ratio L2/L1 is comprised between 0.50-0.85.

3. The aircraft according to claim 1, wherein the distance between the lateral borders of the contour of the cross-section perpendicular to the X-axis of said inner space increases in the direction of the air flow in said first zone and decreases in the direction of the air flow in said second zone.

4. The aircraft according to claim 1, wherein:
the angle $\phi_1$ between the line of the upper surface of the wing and tangent lines to each side of the symmetrical curves in their intersection points is comprised between 90°-120° in all the cross-sections of the ventral fairing;
the angle $\phi_2$ between the line of the lower surface of the wing and tangent lines to each side of the symmetrical curves in their intersection points is comprised between 70°-90° in all the cross-sections of the ventral fairing;
the angle $\phi_3$ between tangent lines to any variable curvature curve of a longitudinal section of the ventral fairing and to a curve of the fuselage in the same longitudinal section in its rear intersection point is less than 15°; and
the angle $\phi_4$ between tangent lines to any variable curvature curve of a longitudinal section of the ventral fairing and to the curve of the fuselage in the same longitudinal section in its forward intersection point is less than 6°.

5. The aircraft according to claim 1, wherein the contour of all the cross-sections perpendicular to the X-axis of the ventral fairing has intersection points with the fuselage so that separated compartments at both sides of the aircraft symmetry plane are formed between the ventral fairing, the fuselage and the wing.

6. The aircraft (11) according to claim 1, wherein in at least a part of the ventral fairing the contour of its cross-sections perpendicular to the X-axis has not intersection points with the fuselage so that a single compartment is formed between the ventral fairing, the fuselage and the wing.

* * * * *